Patented June 21, 1938

2,121,342

UNITED STATES PATENT OFFICE 2,121,342

MANUFACTURE OF ALKYLIDENE DIESTERS

Henry Dreyfus, London, England

No Drawing. Application January 3, 1936, Serial No. 57,450. In Great Britain January 19, 1935

4 Claims. (Cl. 260—106)

This invention relates to the production of aliphatic compounds and is more particularly concerned with the production of ethylidene diacetate and homologous esters.

According to the present invention ethylidene diacetate is produced by subjecting acetylene to reaction with acetic acid, the proportion of acetic acid present being in excess of that theoretically necessary. Thus the acetic acid may be present in the proportion of three to four molecules per molecule of acetylene, or in even higher proportion, e. g. five to six molecules per molecule of acetylene.

By means of the invention it has been found possible to obtain a high yield of ethylidene diacetate containing, at the most, only a small proportion of vinyl acetate.

The process may be carried out very conveniently by passing a mixture of acetylene and vaporous acetic acid through a tube or other form of apparatus maintained at a suitable temperature, and containing filling materials and/or catalysts. In such a method of carrying out the process of the invention the reaction zone may very suitably be maintained at temperatures of 180 to 250° C. although lower or higher temperatures may be employed if desired, for example temperatures of 150 to 300° C. The vaporous mixture employed in such a process may be preheated before being supplied to the reaction zone if desired.

The process is preferably carried out at atmospheric pressure or increased pressure, but reduced pressure may be employed if desired.

As catalysts which may be employed to assist the process may be mentioned those having hydrating properties, for instance zinc, nickel and ferrous oxides and salts, such as acetates or carbonates, of zinc, nickel and iron. Cadmium oxide and salts of cadmium, e. g. cadmium acetate, are also very efficacious as catalysts. Such catalysts may be employed alone or in conjunction with filling materials or surface catalysts, such as pumice, kieselguhr, activated charcoal and silica gel. Mercury salts, e. g. mercuric sulphate, are also very useful catalysts for the process of the invention, more particularly when the reaction is carried out in the liquid phase. Thus a mixture of acetylene and vaporous acetic acid, containing an excess of acetic acid, may be passed into a suspension of mercuric sulphate in acetic acid and/or acetic anhydride maintained at a suitable temperature, e. g. 80–100° C.

The process may be carried out in presence of diluents; for instance a mixture of acetylene, vaporous acetic acid and an inert gas, e. g. hydrogen, carbon dioxide or methane, or vapour, e. g. acetic anhydride vapour, may be supplied to the reaction zone.

It is to be understood that while the invention has been described more particularly with reference to the production of ethylidene diacetate, the invention is not limited in this respect and may be applied to the production of homologous esters by the use of the appropriate aliphatic acid and acetylene hydrocarbon. For instance, by subjecting acetylene to reaction with propionic acid, the proportion of propionic acid present being in excess of that theoretically necessary, ethylidene dipropionate may be obtained. Likewise by employing allylene instead of acetylene there may be obtained propylidene diesters.

It may be remarked that while the reaction carried out in the process of the present invention produces ethylidene diacetate or homologous esters prolongation of the time during which the reaction product is in the reaction zone leads to decomposition of the ester initially produced, with the formation of acetic anhydride and acetaldehyde in the case of ethylidene diacetate.

The following example illustrates the invention but it is to be understood that it is given solely by way of illustration and is not in any way limitative:—

Example

A mixture of acetic acid vapor and acetylene in the proportions of about 4 molecules of acetic acid to each molecule of acetylene is passed through a tube loosely filled with pieces of pumice upon which zinc acetate has been deposited by soaking in a concentrated solution thereof and drying. The tube is maintained at a temperature of 210° to 215° C. and the reaction products are either passed into a water-cooled container connected to a receiver, the ethylidene diacetate produced being separated from unchanged acetic acid by fractional distillation, or subjected to fractional condensation to effect this separation continuously with the process. The uncondensed gas (acetylene) and unchanged acetic acid may be returned to the process.

Having described my invention what I desire to secure by Letters Patent is:—

1. Process for the manufacture of an alkylidene diester, which comprises subjecting an aliphatic acid to reaction in the vapor phase with an unsaturated hydrocarbon of the acetylene series at temperatures of 150 to 300° C., the aliphatic acid vapor being present in a proportion of 3 to 6 molecules per molecule of hydrocarbon.

2. Process for the manufacture of an ethylidene diester, which comprises subjecting an aliphatic acid to reaction in the vapor phase with acetylene at temperatures of 150 to 300° C., the aliphatic acid vapor being present in a proportion of 3 to 6 molecules per molecule of acetylene.

3. Process for the manufacture of ethylidene diacetate, which comprises subjecting acetic acid to reaction in the vapor phase with acetylene at temperatures of 150 to 300° C., the acetic acid vapor being present in a proportion of 3 to 6 molecules per molecule of acetylene.

4. Process for the manufacture of ethylidene diacetate, which comprises subjecting acetic acid to reaction in the vapor phase with acetylene at temperatures of 180–250° C., the acetic acid vapor being present in a proportion of 3 to 6 molecules per molecule of acetylene.

HENRY DREYFUS.